US008521316B2

(12) United States Patent
Louboutin

(10) Patent No.: US 8,521,316 B2

(45) Date of Patent: Aug. 27, 2013

(54) COORDINATED GROUP MUSICAL EXPERIENCE

(75) Inventor: Sylvain Rene Yves Louboutin, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 758 days.

(21) Appl. No.: 12/751,945

(22) Filed: Mar. 31, 2010

(65) Prior Publication Data

US 2011/0245944 A1 Oct. 6, 2011

(51) Int. Cl.
*G06F 17/00* (2006.01)

(52) U.S. Cl.
USPC .......... 700/94

(58) Field of Classification Search
USPC .......... 700/94
See application file for complete search history.

(56) References Cited

U.S. PATENT DOCUMENTS

| | | | | |
|---|---|---|---|---|
| 6,175,632 | B1 * | 1/2001 | Marx | 381/56 |
| 7,657,224 | B2 | 2/2010 | Goldberg et al. | |
| 7,817,960 | B2 * | 10/2010 | Tan et al. | 455/11.1 |
| 7,853,342 | B2 * | 12/2010 | Redmann | 700/94 |
| 8,082,050 | B2 * | 12/2011 | Schmidt et al. | 700/94 |
| 8,173,883 | B2 * | 5/2012 | Willacy et al. | 84/600 |
| 2005/0160270 | A1 * | 7/2005 | Goldberg et al. | 713/176 |
| 2005/0286546 | A1 | 12/2005 | Bassoli et al. | |
| 2006/0095516 | A1 * | 5/2006 | Wijeratne | 709/205 |
| 2006/0224262 | A1 * | 10/2006 | Asada et al. | 700/94 |
| 2008/0077261 | A1 * | 3/2008 | Baudino et al. | 700/94 |
| 2008/0152165 | A1 * | 6/2008 | Zacchi | 381/77 |
| 2008/0195621 | A1 | 8/2008 | Tedesco et al. | |
| 2009/0097672 | A1 * | 4/2009 | Buil et al. | 381/80 |
| 2009/0255395 | A1 * | 10/2009 | Humphrey | 84/470 R |
| 2010/0018382 | A1 | 1/2010 | Feeney et al. | |
| 2010/0070758 | A1 | 3/2010 | Low et al. | |
| 2010/0095829 | A1 * | 4/2010 | Edwards | 84/625 |
| 2011/0141357 | A1 * | 6/2011 | Price et al. | 348/552 |

OTHER PUBLICATIONS

Alon N., Barak A. and Manber U., "On Disseminating Information Reliably Without Broadcasting," Proc. 7-th Int. Conf. on Distributed Computing Systems (ICDCS-7), pp. 74-81, Berlin, Sep. 1987.
Drezner Z. and Barak A., "An Asynchronous Algorithm for Scattering Information Between the Active Nodes of a Multicomputer System," Journal of Parallel and Distributed Computing, vol. 3, No. 3, pp. 344-351, Sep. 1986.
Silent Disco Wireless Headphone System, http://www.lightinthebox.com/Silent-Disco-Wireless-Headphone-System-SMQC164-_p67697,html, Retrieved Mar. 4, 2010.

* cited by examiner

*Primary Examiner* — Paul McCord
(74) *Attorney, Agent, or Firm* — Fish & Richardson P.C.

(57) ABSTRACT

Sharing of a music experience amongst a group of people each using a personal communication device is described. In some cases, the group can congregate at the same geographic location or at least some of the group can be located at widely dispersed locations and yet still be able to share a music experience. Information can be passed between the personal communication devices using point to point wireless communication, a distributed network of computers such as the Internet, a wireless cellular communication network, and so on. The information can include an indication of a shared music characteristic. The personal communication devices can use the shared music characteristic to identify and start to privately play those music items stored in the personal communication device having a characteristic that matches or most closely matches the shared music characteristic at about the same time.

22 Claims, 8 Drawing Sheets

COORDINATED GROUP MUSICAL EXPERIENCE

TECHNICAL FIELD

The embodiments described herein relate generally to systems and methods for facilitating a music experience that can be shared amongst members of a group of people each in possession of a personal communication device. More particularly, the music listened to by each member of the group can be specifically selected by an individual member using a music characteristic common to all members.

BACKGROUND

A silent disco involves party-goers dancing to music received wirelessly directly into headphones. Most commonly, the music is provided by one or sometimes two DJs who broadcast the music via an FM transmitter. Similar to the silent disco, the concept of mobile clubbing involves flash mob gatherings of people (sometimes in the hundreds) at public spaces at least portions of which are temporarily converted to clubbing areas in which people dance while listening to their personal music using MP3 players. Although both mobile clubbing and silent discos involve a gathering of people intent on having a good time, silent discos are typically held at a publicly advertised dance venue. Mobile clubbing on the other hand is more spontaneous in nature and likely to involve a location, such as a train station, not normally considered a dance venue. This spontaneity can provide an added surprise for the unwitting hosts of the space designated as the mobile club as well as members of the general public that happen to be in the general vicinity of the designated location.

However, neither silent discos nor mobile clubs provide for a musical experience that is both specific to the individual and yet common to the group. For example, with the silent disco, there is no individuality since the music is the same for all members of the group since it is the DJs that select the music to play and the participants have no choice but to listen. On the other hand, with mobile clubbing, it is completely individualistic in nature since each participant selects their own music to the exclusion of all others and as such the only thing shared is the location in which the mobile clubbers find themselves.

Therefore, what is desired is a system and method of coordinating a music experience amongst a disparate group of individuals.

SUMMARY OF THE DESCRIBED EMBODIMENTS

It is an advantage of the presently described embodiments to provide a shared music experience to a group of people. More particularly, the shared music experience can be specific to an individual group member but still share a common group music characteristic.

In one embodiment, a method is described. The method can be performed at a first personal communication device by receiving information from an external circuit. In the described embodiment, the information can include an indication of a shared music characteristic. At least some of the information (including the shared music characteristic) can be re-broadcasted concurrently with the receiving. At least a first music item can be selected from a plurality of music items stored in the first personal communication device in accordance with the shared music characteristic. The selected music item can be privately played using a private listening device. The private listening device can take the form of, for example, a pair of headphones, ear buds, and so on.

In another embodiment, a personal communication device is described. The personal communication device can include at least a wireless transceiver arranged for wirelessly receiving information from an external circuit where the information includes at least an indication of a shared music characteristic. The personal communication device can also include a data storage device arranged for storing at least one music item, an audio circuit for playing music items, and a processor coupled to the wireless transceiver, the data storage device, and the audio circuit. When the wireless transceiver receives the information that includes the shared music characteristic, the processor can instruct the wireless transceiver to re-broadcast at least the shared music characteristic. The processor can also instruct the data storage device to provide at least a first music item from the data storage device in accordance with the shared music characteristic. Furthermore, the processor can instruct the audio circuit to play the first music item provided by the data storage device only when a private listening device is attached to the personal communication device.

In yet another embodiment, a method is described. The method can be performed by performing at least the following operations. A notification of a shared musical experience is received at a plurality of personal communication devices, the notification including a designated location and a start time of the shared musical experience. At about the start time, information is wirelessly received at or about the same time at only those of the plurality of personal communication devices at the designated location, the information including a shared music characteristic. At each of the personal communication devices, at least one music item stored on the personal communication device is selected in accordance with the shared music characteristic. Starting at about the same time, each personal communication device privately plays the at least one selected music item that shares the same music characteristic with all other privately played music items.

In still another embodiment, a non-transitory computer readable medium for storing a computer program executable by a processor included in a personal communication device for participating in a shared music experience is described. The computer program includes at least computer code for receiving information at a first personal communication device from an external circuit, the information including an indication of a shared music characteristic, computer code for re-broadcasting information including the shared music characteristic concurrent with the receiving, computer code for selecting at least a first music item from a plurality of music items stored in the personal communication device in accordance with the shared music characteristic, and computer code for privately playing the selected music item.

Other apparatuses, methods, features and advantages of the described embodiments will be or will become apparent to one with skill in the art upon examination of the following figures and detailed description. It is intended that all such additional systems, methods, features and advantages described within this paper be within the scope of and be protected by the accompanying claims.

BRIEF DESCRIPTION OF THE DRAWINGS

The described embodiments and the advantages thereof may best be understood by reference to the following description taken in conjunction with the accompanying drawings in which.

DETAILED DESCRIPTION OF REPRESENTATIVE EMBODIMENTS

Figure 1:
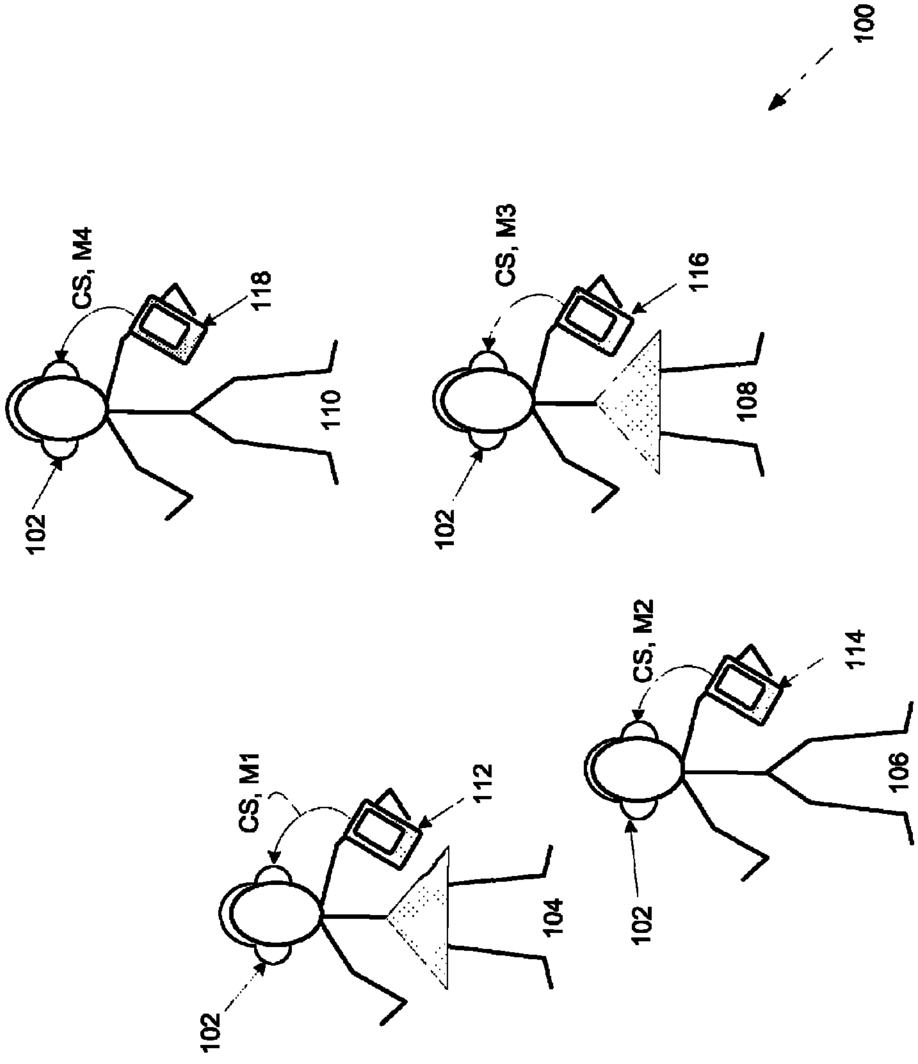
FIG. 1 shows a representative shared music session in accordance with the described embodiments.

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

This paper discusses sharing of a music experience amongst a group of people each using a personal communication device. In some cases, the group can congregate at the same geographic location. In other cases, each, or at least some, of the group can be located at widely dispersed locations and yet still be able to share a music experience. In the latter case, information can be passed between the personal communication devices using point to point wireless communication, a distributed network of computers such as the Internet, a wireless cellular communication network, and so on. In any case, information received at the personal communication devices can include an indication of a shared music characteristic (such as tempo in the form of beats per minute, or bpm) that can be passed between each of the personal communication devices. The personal communication devices can use the shared music characteristic to identify and privately play those music items stored in the personal communication device having a characteristic that matches or most closely matches the shared music characteristic. For example, if the shared music characteristic is a tempo in a range of 90-95 bpm, then any music item stored in a particular personal communication device having a tempo in the range of 90-95 bpm, or thereabouts, can be selected for private listening. It should be noted that by private listening it is meant that each of the group can hear only their own music content and no other. Private listening can be accomplished using private listening devices such as a headphone, ear buds and so on.

In the described embodiments, the personal communication device can take the form of a portable media player along the lines of an iPod™ manufactured by Apple Inc. of Cupertino, Calif. The personal communication device can also take the form of a cellular phone such as an iPhone™ also manufactured by Apple Inc. or as a handheld computing device such as a tablet computer along the lines of an iPad™ also manufactured by Apple Inc. In any case, the personal communication device can be configured to wirelessly receive and in most cases send a signal that can contain information that can include at least the indication of the shared music characteristic. The information can include a snippet or chunk of data that can be broadcasted by one or more devices to other devices that are within the transmission range of the broadcasting device(s). In one embodiment, the snippet or chunk of data can take the form of a token that can be used to seed a group of personal communication devices with the shared music characteristic. The token can be stored in a personal communication device and concurrently broadcasted to any other personal communication device using, for example, short message service (SMS) messaging or a WiFi RF transmission. In this way, by broadcasting the information, each personal communication device can be made aware of the shared music characteristic at about the same time.

If broadcasting the information is not feasible (or deemed inappropriate), an ad hoc peer to peer (P2P) network can be formed using those personal communication devices capable of acting as a node. In this way, a first one of the personal communication devices can be used to seed the P2P network by, for example, wirelessly transmitting a signal that can include the token. For example, the first personal communication device can use a wireless protocol and wirelessly transmit a signal that can include the token, or its equivalent. Devices within the transmission range of the first personal communication device (BlueTooth is about 10 m, or 30 feet) capable of receiving and processing the signal can retrieve the token (or equivalent information) and in some cases store the token (or relevant portions) locally. In order to propagate the information within the P2P network, each device can, concurrently with the receiving of the signal, re-transmit the signal (including the token) to other personal communication devices within range of the sending device. In this way, each personal communication device properly configured for participation in the shared music experience (and within range of at least another one of the participating personal communication devices) can share the same information including the shared music characteristic. In some implementations, in order to participate in the shared music experience, a communication application can be required that can provide the personal communication device with at least the appropriate network protocols required to exchange information with other personal communication devices in the P2P network. For example, various products manufactured by Apple Inc. (such as the iPhone™ and iPhone 3G™, iPod Touch™, iPad™) can participate in a P2P network using network protocols provided by the communication application.

In the described embodiments, the signal received at the personal communication device can include information other than the shared music characteristic. For example, the personal communication device can retrieve relevant information from the token that can include the shared music characteristic. However, in some cases, after retrieving, the personal communication device can also inquire if the signal includes information other than the shared music characteristic. Such information can include any personal communication device identifiers, or PCDIDs, indicating the identity of those personal communication devices that have already received the information. In this way, a personal communication device can retrieve not only information related to the shared music characteristic, but other information related to those personal communication devices participating in the shared music experience. One of the features of the PCDID is the ability to facilitate social networking within the group. For example, each member of the group can create a personal identifier, also referred to as an avatar. The avatar can take many forms, such as an identifying insignia, cartoon face, and so on. In any case, the unique identifier (including any personalized information associated therewith) can be associated with the PCDID of the personal communication device and be passed between various other personal communication devices. In this way, a dynamic social network can be formed independent of or in conjunction with the shared musical experience.

In addition to the shared music characteristic and any PCDIDs used to identity personal communication devices, the information (or the token for that matter) can include other information such as a time counter used to specify a start time and a stop time for a particular music session. In some cases in order to assure that the group is listening to music and as a result, moving in unison, various techniques can be used to ensure that the various beats per minute observed by individual members of the group are synchronized with each other. Beat synchronization is not an issue when the shared music characteristic is broadcasted to the group. However, in a distributed network such as a P2P network, techniques such as those known as the Berkeley Algorithm can be used. The Berkeley Algorithm is described in detail in Software Engineering, IEEE Transactions on (IEEE) 15 (7): 847-853, "The accuracy of the clock synchronization achieved by TEMPO in Berkeley UNIX 4.3BSD" by Gusella and Zatti (1989) which is incorporated by reference in its entirety for all purposes.

It should be noted that the shared music characteristic does not distinguish music content per se, but describes a characteristic of the music content. In this way, no music content is distributed amongst the personal communication devices. The shared music characteristic can be used to select music items stored on each of the personal communication devices. The selection of music items can be carried out in any number of different ways. For example, one of the ancillary services provided by the communication application can include categorizing music items stored on the personal communication device based upon various values of a particular music characteristic. The communication application can cause those music items having a music characteristic that matches the music characteristic for a particular music session to be selected. The selected music items can be prepared for private playing to a user of the personal communication device by way of a private listening accessory, such as headphones. In one embodiment, the music item(s) selected can be added to a playlist of music items for private playing. The playlist can be created listing all, or at least most, of the matching music items. The playlist can be presented for viewing on the personal communication device and in some cases, made available to the user for manual selection of specific music items. It should be noted that the music items selected can all have the session music characteristic in common.

These and other embodiments are discussed below with reference to FIGS. 1-8. However, those skilled in the art will readily appreciate that the detailed description given herein with respect to these figures is for explanatory purposes only and should not be construed as limiting.

FIG. 1 shows group 100 enjoying a shared music experience in accordance with an embodiment of the invention. Along the lines of a silent disco or mobile clubbing, group 100 can congregate at any location(s) for the event. The congregating can occur, for example, at a pre-arranged dance venue (such as a dance club). Alternatively, the participants can each be apprised of the location of the event by, for example, SMS messaging, emails (similar to a silent disco), instant messages, Twitter, or other techniques like those used to generate a flash mob. In some cases, individuals or groups of individuals can be geographically dispersed but still be able to share the same musical experience. In any case, at or about the designated starting time, each personal communication device (PCD) can privately play music content for the associated member of group 100. By privately playing it is meant that only the member in possession of the personal communication device can hear the privately played music content. This audio privacy can be accomplished using private listening accessory 102 along the lines of a head phone, ear bud, and so on. However, unlike the silent disco where all members are listening to the same music content broadcast by the DJ, or the participants in mobile clubbing where members hear their own music content unrelated to that of the other participants, the members of group 100 share a common music experience based upon the session music characteristic. Since the session music characteristic can include tempo (beats per minute), the members of group 100 can each move in relation to the session music characteristic resulting in a coordinated group dynamic which can change from music session to music session or even in some cases, during a session.

As shown in FIG. 1, members 104-110 of group 100 are each listening by way of private listening accessory 102 to music content from music items selected by each member from all music items stored on their respective portable media devices. The selected music items can be identified as those music items that most closely match the session music characteristic. In this way, the music content M played by the members of group 100 during a shared music session are only related to each other by the session music characteristic. For example, PCD 112 associated with member 104 can be privately playing music content $M_1$ selected for play based upon session music characteristic $C_S$, PCD 114 associated with member 106 can be privately playing music content $M_2$ also selected for play based upon session music characteristic $C_S$, and so on. Although music content $M_2$ is selected for play based upon session music characteristic $C_S$, the personal music preference of member 106 subjectively determines music content $M_2$. In this way, there can be no relation between music content $M_1$ and music content $M_2$ except for their relationship to session music characteristic $C_S$. The same can be said for all members of group 100 regardless of the total number of members in group 100. For example, PCD 116 associated with member 108 can be privately playing music content $M_3$ whereas PCD 118 associated with member 110 can be privately playing music content $M_4$ where music content $M_1$-$M_4$ are related to each other only by way of session music characteristic $C_S$. Since the ultimate choice of the music content played depends solely upon the subjective choice of each member of group 100, the diversity of music content M can be about the same as the total number of members in group 100.

In order to participate in a shared music session, each of PCD 114-PCD 118 must be apprised of session music characteristic $C_S$ in order for each personal communication device to select and play appropriate music items. In order to assure that each of the personal communication devices in group 100 utilizes the appropriate value of session music characteristic $C_S$, a communication application (not shown) can be provided and stored on each of the personal communication devices. In one embodiment, the communication application can be part of an operating system provided upon the original purchase of a personal communication device. Alternatively, the communication application can be obtained after market using, for example, remote media management services along the lines of iTunes. On the other hand, the communication application can be obtained in an ad hoc manner during, for example, an initial invitation session whereby part of an individual acceptance of an invitation to participate in the shared music session (using email, SMS messaging, Facebook, and so on) involves downloading and installing the communication application with a subsequent verification and acceptance.

Figure 2:
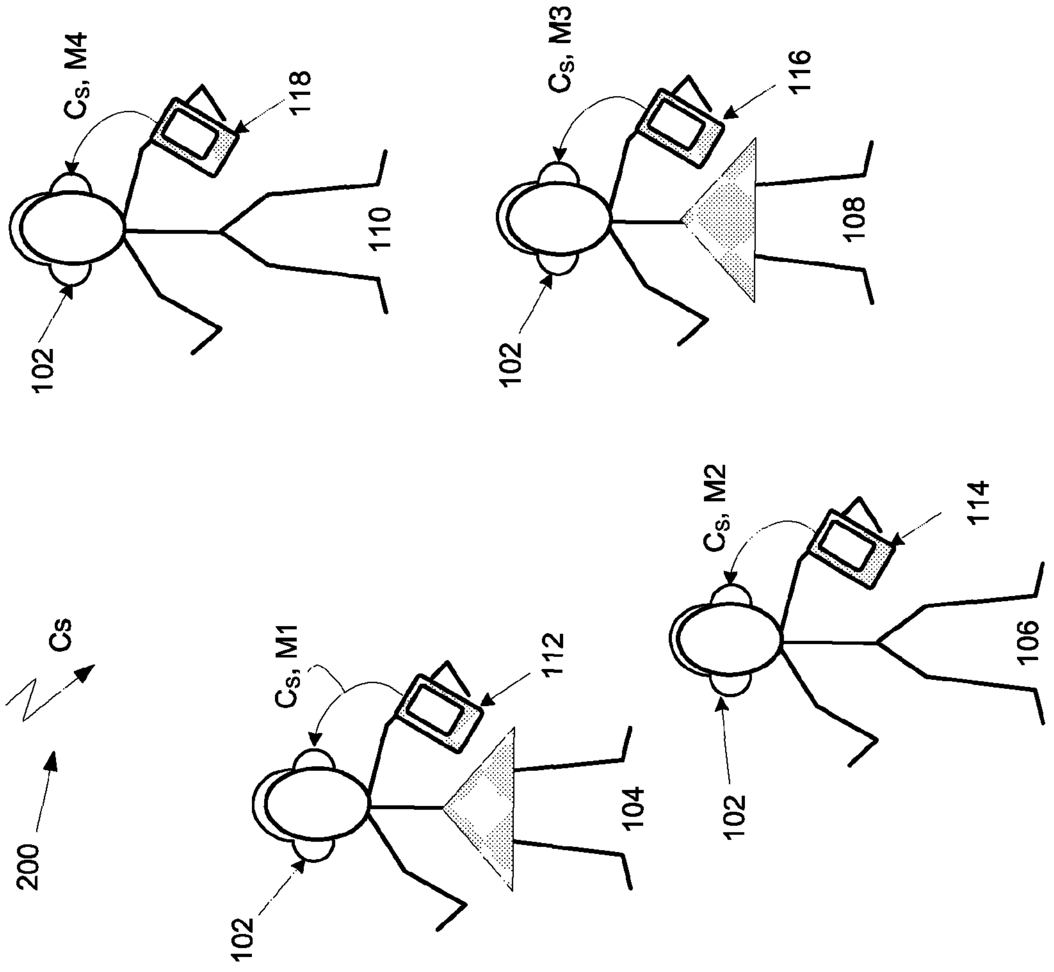
FIG. 2 shows a music session mediated by an over the air (OTA) broadcast signal.

In some cases, it may not be possible to form an ad hoc P2P network that includes all, or even, most members of group 100. For example, there may not be a sufficient number of personal communication devices that possess both receive and transmit capabilities that could result in the inability to seed the P2P network with updated information. Accordingly, FIG. 2 shows an embodiment whereby communication applications PCD 112-118 each receive updated information that can include session music characteristic $C_S$ that does not rely upon establishing an ad hoc P2P network. In this case, each personal communication device can receive updated session music characteristic $C_S$ directly by way of broadcast 200. It should be noted that broadcast 200 can take the form of a wireless RF transmission using any number and combination of available wireless protocols. For example, broadcast 200 can take the form of conventional over the air (OTA) AM or FM broadcast in which case the user can be instructed to manually input the appropriate information to their respective personal communication device. Alternatively, broadcast 200 can take the form of a WiFi or Bluetooth RF signal that the communication application can recognize as including the updated music characteristic information.

Figure 3:
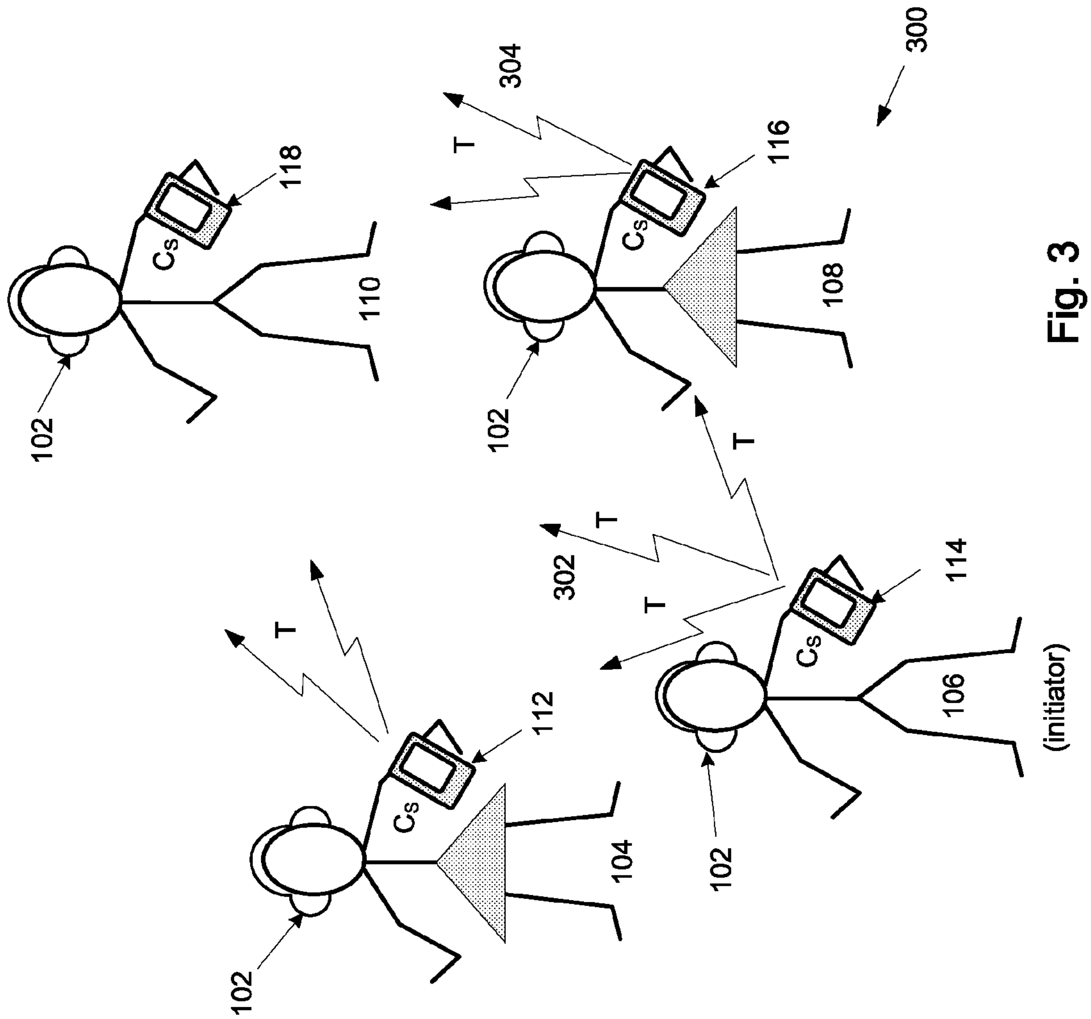
FIG. 3 shows an ad hoc P2P network suitable for implementing the described embodiments.
Figure 4:
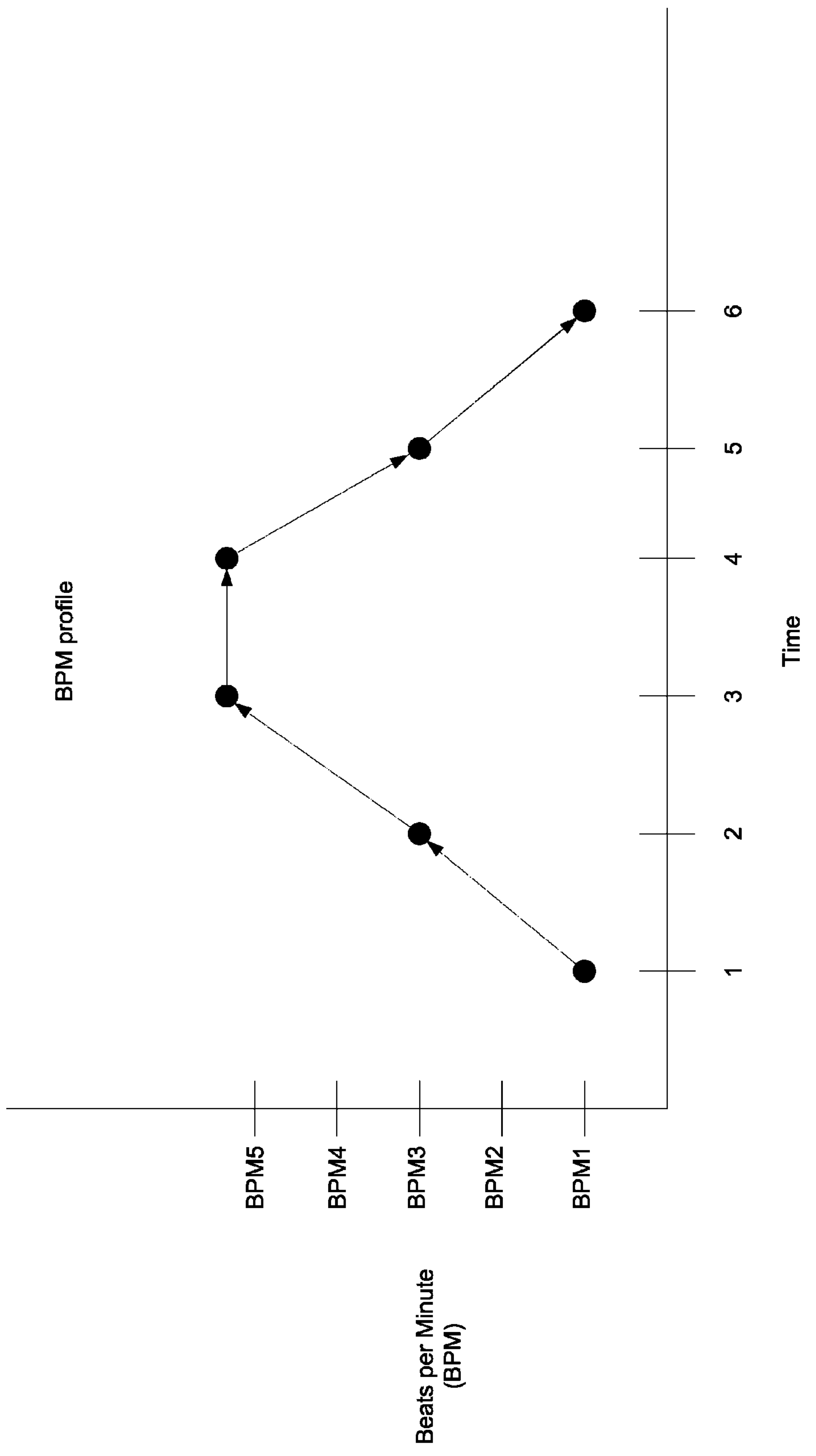
FIG. 4 shows a representation of a variable shared music characteristic in the form of a time based tempo.

In those cases, however, where ad hoc P2P network 300 can be formed, FIG. 3 shows a scenario whereby a limited number of members of group 100 (referred to as initiators) can be identified to seed P2P network 300 (having PCDs 112-118 as nodes) with token T. For a more detailed description of the heuristics of distributing information in an ad hoc P2P network please refer to "On Disseminating Information Reliably Without Broadcasting", Proc. 7-th Int. Conf. on Distributed Computing Systems (ICDCS-7), pp. 74-81 Berlin, September 1987 by Alon, N., Barak, A. and Manber, U and "An Asynchronous Algorithm for Scattering Information Between the Active Nodes of a Multicomputer System", Journal of Parallel and Distributed Computing, Vol. 3, No. 3, pp. 344-351, September 1986 by Drezner, Z. and Barak each incorporated by reference in their entireties. Assuming that member 106 has been designated as an initiator, member 106 can seed ad hoc P2P network 302 with token T. Token T can include information that can be used to update session music characteristic $C_S$. For example, if the current session music characteristic $C_S$ identifies music tempo $t_1$ then token T can be used to update music tempo from tempo $t_1$ to tempo $t_2$. In the described embodiment, tempo $t_2$ can be faster or slower than $t_1$ or in some cases represent a variable tempo $t(\mu)$ related to variable $\mu$. For example, if the variable $\mu$ is time, then, as shown in FIG. 4, tempo $t(\mu)$ can change in time such that at specified time intervals, the communication application can select music items based upon a periodically changing tempo value. In this way, as the tempo of music content M varies, it is likely that the members of group 100, if dancing, will exhibit dance motions that track with the change in music tempo providing additional entertainment.

Referring back to FIG. 3, it is foreseeable that due to local conditions, it may not be possible to reliably send information from one node directly to another node in P2P network 300. For example, PCD 114 belonging to member 106 (initiator) can broadcast token T that can be received by PCD 112 and PCD 116 belonging to members 104 and 108, respectively. However, member 110 may be too far away or may be in an area (such as behind a wall) where direct reception by PCD 118 is unlikely. Therefore, each node of network 300 can be instructed to concurrent with wirelessly receiving token T, wirelessly transmit token T. For example, when PCD 116 (as well as PCD 112) wirelessly receives token T, each can generate re-broadcast signal 304 that includes token T received from member 106. In this way, PCD 118 can receive re-broadcast signal 304 from PCD 116 (as well as that from PCD 112) and with it the current version of token T.

In some cases, a music session can have session rules. The session rules can define various relationships and actions that can occur between the members of the group during a specific music session. For example, the session rules can provide for an individual member actively becoming an initiator. In this way, by choosing to be the initiator, the individual member can select the session music characteristic. In this way, the individual member can become, in effect, a roving "DJ" at least while in control of the current music characteristic. In another case, the role of roving DJ can be passed (either voluntarily for the current roving DJ or automatically without the assent of the current roving DJ) to another member of the group. In this way, the music session can take on a variety of different milieus based upon the preferences of the member holding forth as the current roving DJ. In some embodiments, the identity of the roving DJ can be kept anonymous. However in order to facilitate social interaction, the identity of the current roving DJ can be passed to the active personal communication devices using PMD identifiers that can be associated with, for example, individual avatars that can be displayed on any of the active personal communication devices.

Figure 5:
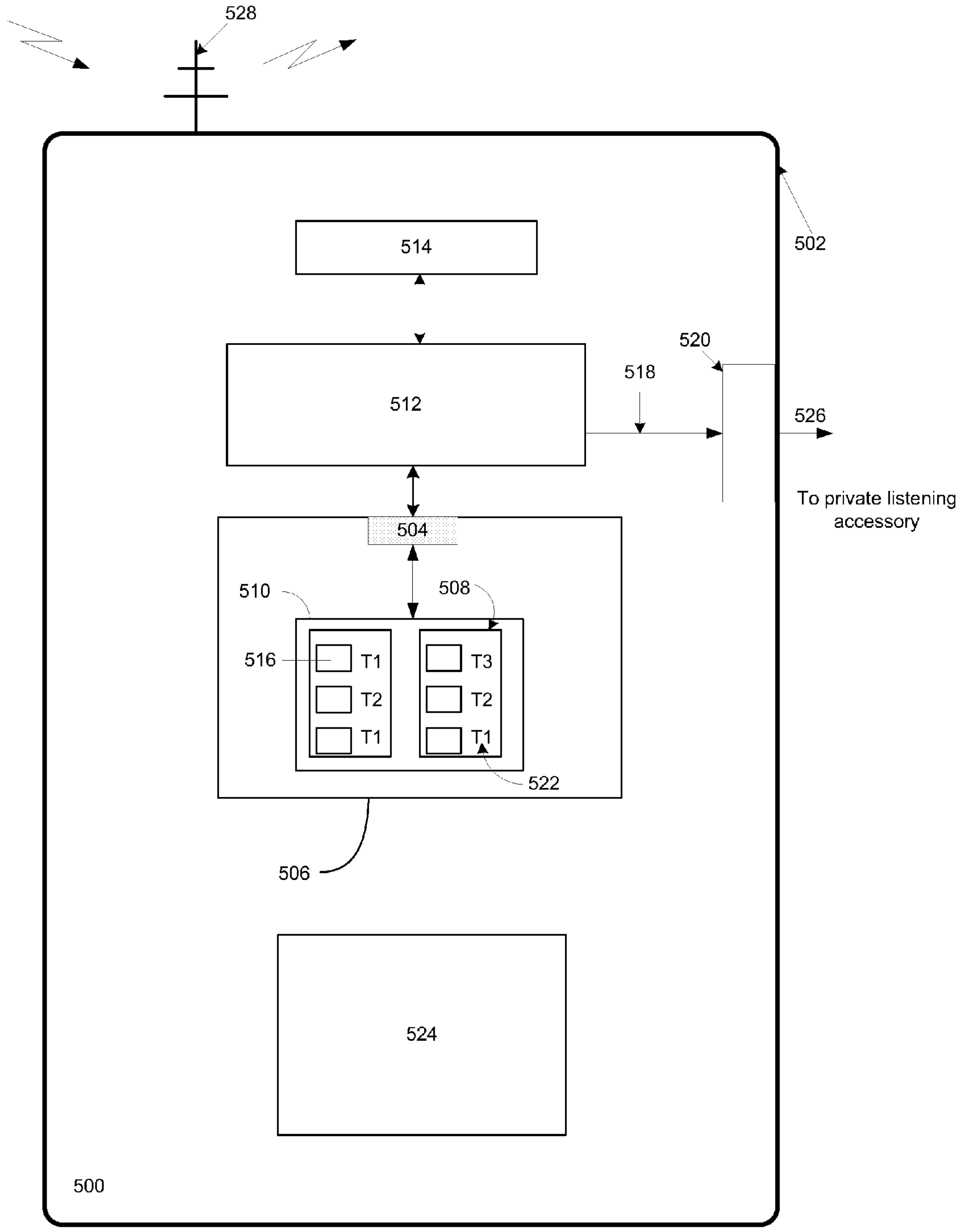
FIG. 5 shows representative personal communication device (PCD) in accordance with the described embodiments.

FIG. 5 shows a block diagram of representative personal communication device (PCD) 500 in accordance with the described embodiments. PCD 500 can be formed to include at least housing 502 configured to enclose and support various operational circuits. In some cases, PCD 500 can include controller 504 used to control data storage device 506 that can be used for storing a plurality of data files that can take the form of, for example, audio data, textual data, graphical data, image data, video data and multimedia data. The stored data files can be encoded either before or after being stored using a variety of compression algorithms. It should be noted that a user can interact with music manager 512 through an interface. For example, audio data can be compressed using MP3, AAC and Apple Lossless compression protocols whereas images can be compressed using, JPEG, TIFF and PNG compression. Moreover, video data can be compressed using H.264, MPEG-2 and MPEG-4 and so on. The audio data can include, for example, music files 508 stored in music store 510 controlled by music manager 512. Music manager 512 can be embodied as software executed by processor 514 or as a separate hardware component. In any case, music manager 512 can control the audio output of music files 508 stored in music store 510.

During operation, for example, music manager 512 can select music item 516 from music file 508 which can be decoded by music manager 512 using an appropriate codec. The decoded music file can then be output as audio signal 518 to audio output interface 520. In accordance with one embodiment, music manager 512 can select music items 516 with particular characteristics and/or adjust characteristics of music items 516 to meet a particular need such as matching more closely with a desired music characteristic. Furthermore, in order to make it easier on the music manager 512 to save time and processing power, each music item can include tag 522 that can indicate a particular music characteristic such as the tempo of the associated music item 516. For example, tag 522 can take on value $t_1$ to indicate that the associated music item has a tempo of $t_1$, and so on. Tag 522 can be part of the original music file, or it can be created when the music file is acquired (e.g., downloaded). By providing tags 522, music manager 512 does not have to determine the tempo of each music item on its own. It simply has to select the music item with the desired tempo by looking at the tags 522 that can be associated with metadata corresponding to a particular music item. Tag 522 can be a simple number (such as 120 bpm).

User input interface 524 can assist a user of PCD 500 in controlling various functions performed by PCD 500. For example, user interface 524 can include a touch sensitive layer (not shown) that can facilitate the use of a user touch event for inputting control instructions. In the case where PCD 500 includes speakers, then audio signal 518 can be broadcast to the external environment via the speakers. However, in those situations where PCD 500 does not include speakers, or the speakers can be bypassed, PCD 500 can include private listening interface 526 suitable for directing audio signal 518 to an external transducer associated with a personal listening accessory, such as earphones, ear buds, and so on. In this way, the user of PCD 500 can privately listen to audio output by music manager 512. PCD 500 can also include wireless interface 528 arranged to both receive and transmit information by way of any suitable wireless protocol such as, for example, WiFi, Bluetooth, and so on capable of accessing various configurations of wireless networks, such as WLAN or peer to peer (P2P). It should be noted that even though only a limited set of components are shown this does not imply a limitation on the functional components that can be included in PCD 500. For example, in addition to the components shown in FIG. 5, embodiments of PCD 500 can also include a power connector, a data transfer component, voice recognition circuits, and so on.

In one implementation, music manager 512 can adjust the characteristics, such as tempo, of a music item. This change of characteristic can be performed in situ or in real time as the music item is being decoded. Moreover, using tempo as an example, media manager 512 can adjust the tempo of the music items to match the desired tempo as indicated in a music token described in more detail below. For example, if the music token indicates it is desired that music associated with a music item have a tempo of 120 beats per minute and the current version of the music item has a tempo of 140 beats per minute, then music manager 512 can decrease the tempo of the music item from 140 bpm to 120 bpm thereby matching the tempo indicated by the music token.

In another implementation, media manager 512 can select music items having tempos that closely match a desired tempo indicated in the music token. For example, the music token can provide a desired tempo and thereafter media manager 512 may browse through all the music files 508 stored in the music store 510 looking for music items 516 with similar tempos. Once matches are made, media manager 512 outputs only those music items 516 which have tempos that closely match the desired tempo. In some cases, music files 508 can contain multiple versions of the same music items where each version has a different tempo. In this way, more music items 516 can be made available for outputting. By way of example, music files 508 can contain the original version of a music item as well as one or more increased tempo versions of the same music item, and one or more decreased tempo versions of the same music item. The different versions of the music item may be part of the original music file, or they may be created when the music file is downloaded either to a host device that serves PCD 500 or to PCD 500 itself.

In yet another implementation, music manager 512 can be configured to both select music items 516 having tempos that closely match a desired tempo and to adjust the tempo of the audio track as it is being outputted. This particular embodiment may be used to reduce the processing power typically required to adjust the tempo of music item 516. Because the tempo of the music item has already been pre-selected to closely match the desired tempo, only small adjustments need to be made to more closely match the tempo of the music item with the desired tempo. For example, if the desired tempo is 120 bpm, music manager 512 can select music items having tags that indicate between about 115 bpm and about 125 bpm, and thereafter music manager 512 may adjust the tempo of the music item to bring it to about 120 bpm.

Figure 6:
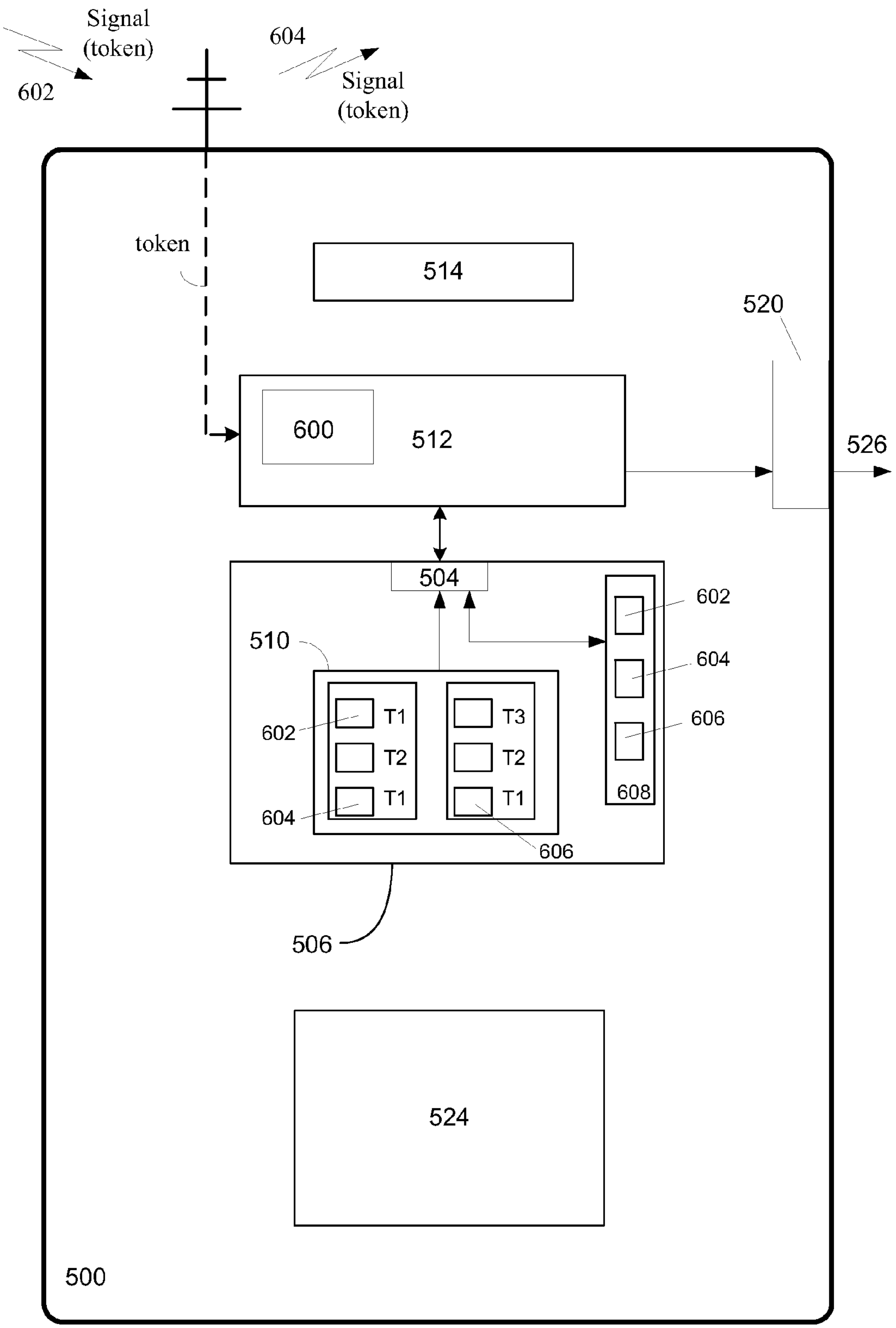
FIG. 6 shows an embodiment of a PCD during a shared music session in accordance with the described embodiments.

FIG. 6 shows an operational diagram of PCD 500 used to provide a coordinate music experience in accordance with the described embodiments. Communication application 600 can provide instructions executable by processor 514 for controlling the operations of PCD 500. In the described embodiment, the communication application can be downloaded from an online data store automatically or as a result of a user selection at user interface 524 from a central media management application (such as iTunes™) or from Apps Store maintained by Apple Inc. Alternatively, communication application 600 can be present at the time of original purchase. In any case, communication application 600 allows music token T to be periodically updated. The updating can occur, for example, during a synchronization operation performed between PCD 500 and a central media management application (such as iTunes™). The updating can also occur on an ad hoc basis during a shared music session.

Communication application 600 can provide a mechanism by which a user of PCD 500 can participate in a coordinate group musical experience with others having personal communication devices similarly configured. In addition to providing services required for participation in the shared music experience, communication application 600 can provide PCD 500 with at least the appropriate network protocols required to exchange information with other personal communication devices in a P2P network. In addition to providing the requisite communication protocols, communication application 600 can provide services related to categorizing music items stored on PCD 500 based upon various values of a particular music characteristic.

In any case, at a designated time, if PCD 500 is positioned at the designated location for the shared music session, PCD 500 can obtain music token T by way of RF transmission 602. It should be noted that if PCD 500 is a node in a P2P network, RF transmission 602 can originate from another personal communication device within the network. In this situation, upon receiving token T, PCD 500 can generate re-broadcast signal 604 that includes at least token T. In this way, other personal communication devices with the P2P network can receive update information related to token T. In those situations, however, where it is not feasible to form the P2P network, token T can be transmitted by way of RF transmission 602 that originates from a central broadcaster unit. In some cases, it is possible that PCD 500 does not have wireless capabilities, in which case the token T can be provided by the communication application 600. In this way, a more limited shared music session can be held since only those personal communication devices that have the same version of communication application 600 can participate. For example, in order to participate, PCD 500 will require the latest version of token T which can be obtained during, for example, a synchronization operation performed between the personal communication device and a central media management application (such as iTunes™).

Once token T has been received, processor 514 can determine if token T has an indication of a shared music characteristic. For example, token T can indicate that a current shared characteristic is tempo t1 indicating that only those music items stored in music store 510 are suitable for being privately played. In this case, shared music characteristic indicates that only those music items tagged as having a tempo consistent with tempo t1 can be privately played by PCD 500. Accordingly, music items 602, 604, and 606 each tagged as having tempos that correspond to tempo t1 are copied to playlist 608. In the described embodiment, playlist 608 can be visually displayed at interface 524. Alternatively, playlist 608 can be invisible to a user of PCD 500. In any case, only those music items selected and linked with playlist 608 can be decoded and privately played by PCD 500.

Figure 7:
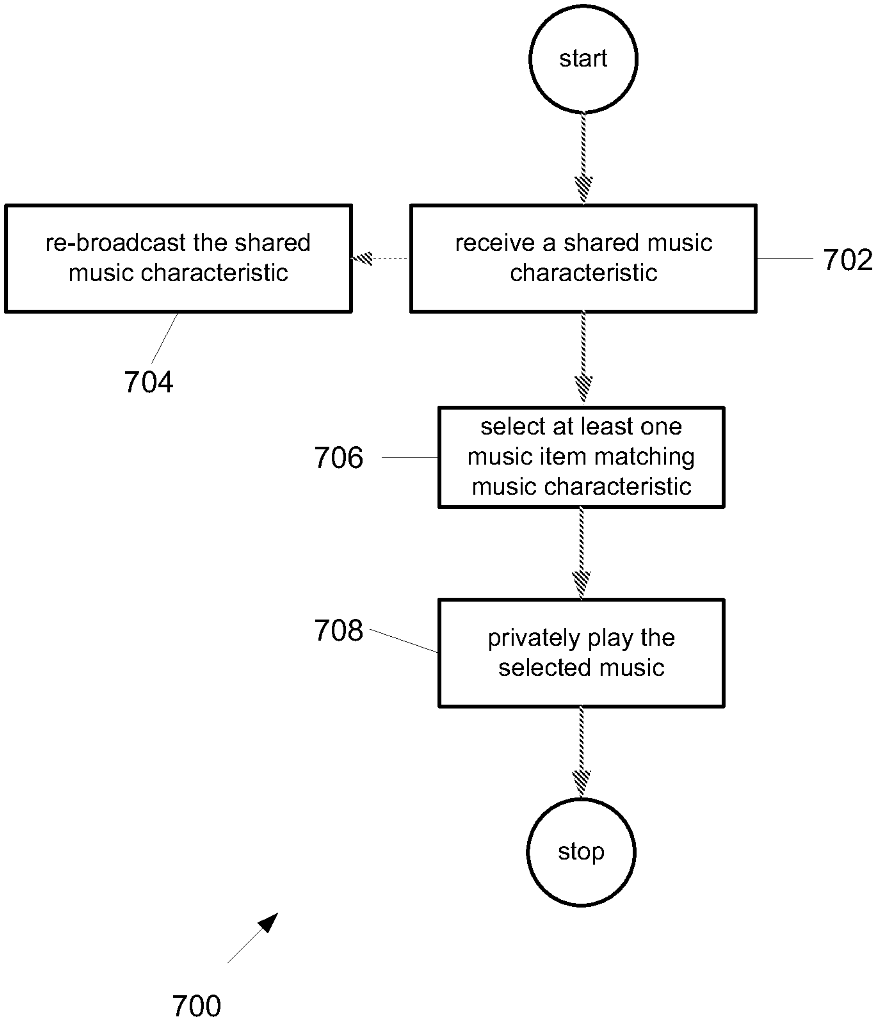
FIG. 7 shows a flowchart detailing a process in accordance with the described embodiments.

FIG. 7 shows a flowchart detailing process 700 in accordance with the described embodiments. Process 700 can be carried out by performing at least the following operations. At 702, a signal that includes a shared music characteristic can be received at a first one of a plurality of personal communication devices. The shared music characteristic can be used to select music items for private playing of each of the plurality of personal communication devices. It should be noted that the shared music characteristic can be obtained in any number of different ways. For example, if the personal communication device is included in a wireless network, the shared music characteristic can be obtained wirelessly. At 704, concurrently with the reception of the signal, the personal communication device can re-broadcast the signal that includes the shared music characteristic for reception by at least another portable media player. At 706, a music item is selected from those music items stored in the PCD that matches, or most closely matches, the shared music characteristic. For example, if the shared music characteristic is a music tempo having a value of 100 beats per minute (bpm), then any music item having a tempo close to about 100 bpm can be a candidate for selection. Once a music item has been selected, the selected music item can be privately played at 708. By privately played it is meant that only an individual currently in possession of the PCD can hear the played music item. This private playing can be accomplished using a private playing accessory along the lines of a headphone, ear buds, and so on.

Figure 8:
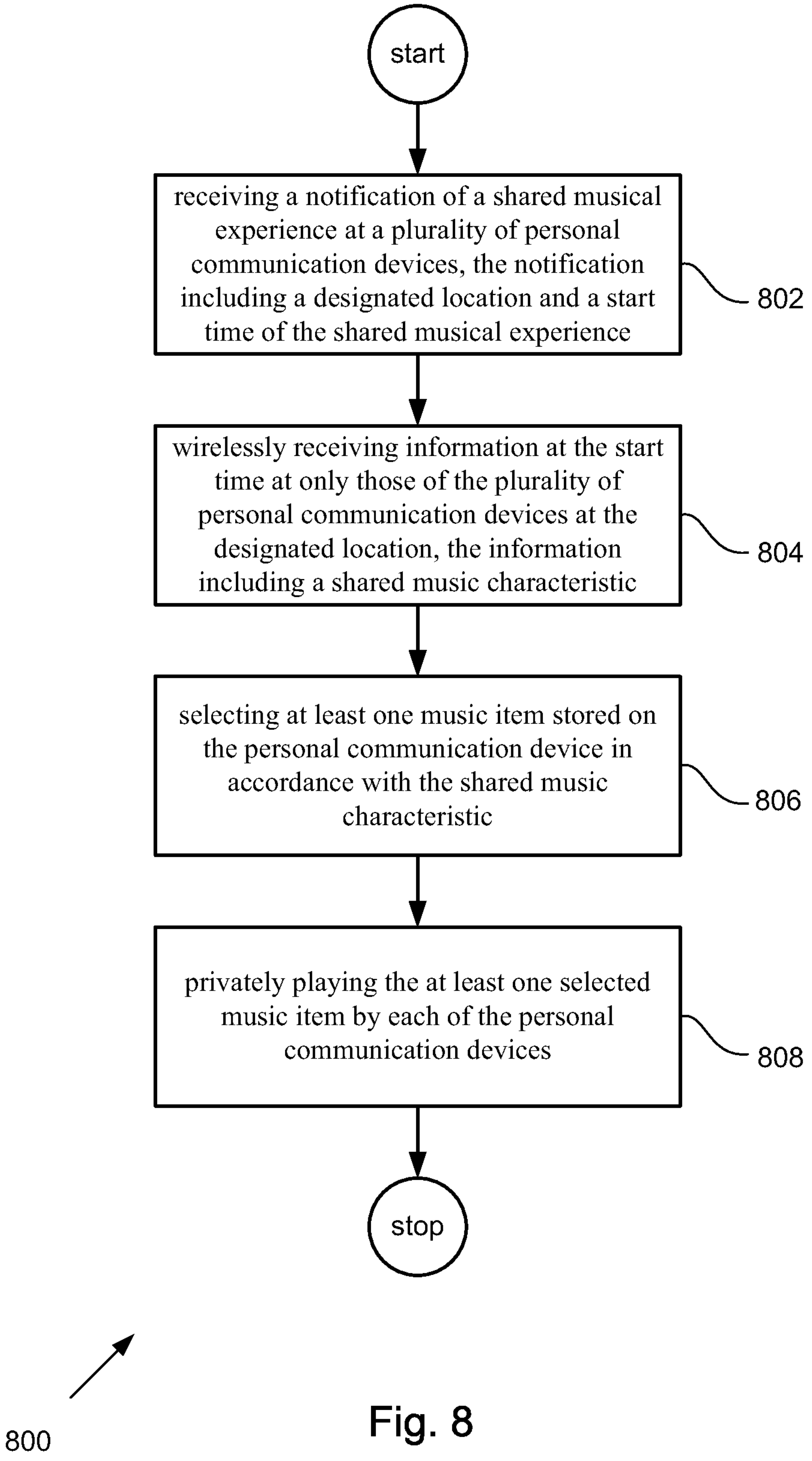
FIG. 8 illustrates a flowchart detailing a process for coordinating a shared musical experience in accordance with the described embodiments.

FIG. 8 illustrates a flowchart detailing process 800 for coordinating a shared musical experience in accordance with the described embodiments. Process 800 can begin at 802 by receiving a notification at a plurality of personal communication devices of a shared musical experience. In the described embodiment, the notification can be received wirelessly using any number of appropriate wireless protocols. For example, the notification can be received via a short message service (SMS) message or a WiFi RF transmission. In any case, the notification can include at least a designated location and a start time of the shared musical experience. In those cases where participating in the shared musical experience requires a shared musical experience application, those portable communication devices not having the required shared musical experience application can receive the shared musical experience application. In most cases, the application can be downloaded from an application server such as the AppsStore managed by Apple Inc of Cupertino, Calif. At 804, information that includes at least a shared music characteristic is wirelessly received at about the start time at only those of the plurality of personal communication devices at the designated location and having the appropriate shared music experience application. In this way, the shared music characteristic can be broadcasted to essentially all of the participating personal communication devices. The shared music characteristic can include any feature of a music item not limited to tempo, genre, and so on. In the case of the shared music characteristic being tempo, the tempo is typically expressed in terms of beats per minute, or bpm.

In some cases, however, not all of the participating personal communication devices are capable of wirelessly receiving the information at about the start time due to extrinsic circumstances such as physical obstacles that block the signal, and so on. In these cases, other personal communication devices can relay the information in a point to point manner. In any case, once the shared music characteristic. Once the shared music characteristic is received at a particular personal communication device, at least one music item stored in the personal communication device is selected at 806 in accordance with the shared music characteristic. In some cases, a music item having a music characteristic within a range of the shared music characteristic can be selected. For example, if the shared music characteristic is a tempo of 90 bpm, then any music item having a tempo in a range of about 85-95 can be selected. At 808, at least one selected music item is privately played by each of the personal communication devices. In the described embodiment, the music functions of each of the personal communication devices can be synchronized in such a way that the privately played music items are played in unison. It should be noted that in any case, the privately played music items each shared the same music characteristic associated with the shared music characteristic but have music content based solely upon a subjective choice of a user of the personal communication device.

Various aspects, embodiments, implementations or features of the described embodiments can be used separately or in any combination. Various aspects of the described embodiments can be implemented by software, hardware or a combination of hardware and software or a non-transitory computer readable medium that can be any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

The embodiments were chosen and described in order to best explain the underlying principles and concepts and practical applications, to thereby enable others skilled in the art to best utilize the various embodiments with various modifications as are suited to the particular use contemplated. It is intended that the scope of the embodiments be defined by the following claims and their equivalents.

What is claimed is:

1. A method, comprising;

receiving information at a first personal communication device from a second personal communication device, the information including an indication of a shared music characteristic of a first music content privately playing on the second personal communication device, the first music content included in a first music item selected for playing from a plurality of first music items stored in the second personal communication device;

selecting at least a second music item from a second plurality of music items stored in the first personal communication device in accordance with the shared music characteristic;

and privately playing the selected second music item on the first personal communication device, where the selected second music item includes second music content that shares the music characteristic with first music content stored on the second personal communication device, and where the first and second music content are different.

2. The method as recited in claim 1, further comprising:

synchronizing music playing functions of the first personal communication device and the second personal communication device.

3. The method as recited in claim 2, wherein the synchronized first and the second personal communication devices start privately playing the music items at about the same time.

4. The method as recited in claim 1, wherein the first music item and the second music item have the shared music characteristic in common.

5. The method as recited in claim 1, wherein the shared music characteristic is tempo in beats per minute (bpm).

6. The method as recited in claim 1, further comprising:

updating the shared music characteristic at the first personal communication device;

broadcasting the updated shared music characteristic; and selecting a third music item in accordance with the updated shared music characteristic.

7. The method as recited in claim 6, further comprising:

at the second personal communication device, receiving the broadcasted updated shared music characteristic; and selecting a fourth music item in accordance with the updated shared music characteristic.

8. The method as recited in claim 7, further comprising:

synchronizing the music playing functions of the first and the second personal communication devices when needed; and starting the private play of the third and fourth music items at about the same time, wherein the third music item and the fourth music item have the shared music characteristic in common.

9. A personal communication device, comprising:

a wireless transceiver arranged for receiving information from a second personal communication device, the information including an indication of a shared music characteristic of first music content privately playing on the second personal communication device, the first music content included in a first music item selected for playing from a plurality of first music items stored in the second personal communication device;

a data storage device arranged for storing at least one music item;

an audio circuit arranged to process music items; and a processor coupled to the wireless transceiver, the data storage device, and the audio circuit, wherein when the wireless transceiver receives the information that includes the shared music characteristic, the processor:

instructs the data storage device to provide at least a second music item in accordance with the shared music characteristic, and instructs the audio circuit to process and play the second music item when a private listening device is attached to the personal communication device, where the second music item includes second music content that shares the music characteristic with the first music content stored on the second personal communication device, and where the first and second music content are different.

10. The personal communication device as recited in claim 8, wherein the first and the second personal communication devices each includes a synchronization unit arranged to synchronize music playing functions of the first personal communication device and the second personal communication device.

11. The personal communication device as recited in claim 10, wherein the first music item and the second music item have the shared music characteristic in common.

12. The personal communication device as recited in claim 9, wherein the shared music characteristic is beats per minute (bpm).

13. A method, comprising:

receiving a notification of a shared musical experience at a plurality of personal communication devices, the notification including a designated location and a start time of the shared musical experience;

at the start time, wirelessly receiving information at those of the plurality of personal communication devices at the designated location, the information including a shared music characteristic;

at each of the personal communication devices that wirelessly received the information, selecting at least one music item stored on the personal communication device in accordance with the shared music characteristic, where the selected music item includes first music content that shares the music characteristic with second music content stored on another personal communication device, and where the first and second music content are different; and privately playing the at least one music item selected by each of the personal communication devices starting at about the same time, wherein the selected music items privately played by each of the personal communication devices have the same shared music characteristic.

14. The method as recited in claim 13, wherein the shared music characteristic is tempo in beats per minute (bpm).

15. The method as recited in claim 13, further comprising:

updating the shared music characteristic at a first personal communication device;

broadcasting the updated shared music characteristic; and selecting at least a music item in accordance with the updated shared music characteristic by the first personal communication device.

16. The method as recited in claim 15, further comprising:

receiving the updated shared music characteristic at those of the plurality of portable communication devices within a wireless range of the first personal communication device;

at each of the receiving personal communication devices, concurrent with the receiving, re-broadcasting the updated shared music characteristic; and selecting at least another music item in accordance with the shared music characteristic.

17. The method as recited in claim 13, further comprising:

wirelessly receiving a shared musical experience application at those of the plurality of personal communication devices determined to not include the shared music experience application.

18. A non-transitory computer readable medium for storing a computer program executable by a processor included in a personal communication device for participating in a shared music experience, the computer program comprising:

computer code for receiving information at a first personal communication device from a second personal communication device, the information including an indication of a shared music characteristic of first music content privately playing on the second personal communication device, the first music content included in a first music item selected for playing from a plurality of first music items stored in the second personal communication device;

computer code for selecting at least a second music item from a plurality of music items stored in the personal communication device in accordance with the shared music characteristic, where the selected second music item includes second music content that shares the music characteristic with first music content stored on the second personal communication device, and where the first and second music content are different; and computer code for privately playing the selected music item.

19. The computer readable medium as recited in claim 18, further comprising:

computer code for synchronizing music playing functions of the first personal communication device and the second personal communication device.

20. The computer readable medium as recited in claim 19, further comprising:

computer code for privately playing the first and second music items at the synchronized first and second personal communication devices, respectively.

21. The computer readable medium as recited in claim 20, wherein the first music item and the second music item have the shared music characteristic in common.

22. The computer readable medium as recited in claim 18, wherein the shared music characteristic is beats per minute (bpm).

* * * * *

UNITED STATES PATENT AND TRADEMARK OFFICE

CERTIFICATE OF CORRECTION

PATENT NO. : 8,521,316 B2
APPLICATION NO. : 12/751945
DATED : August 27, 2013
INVENTOR(S) : Sylvain René Yves Louboutin It is certified that error appears in the above-identified patent and that said Letters Patent is hereby corrected as shown below:

In the Claims

Column 14, Lines 7-8 at Claim 10:
delete "claim 8," and
insert -- claim 9, --, therefor.

Signed and Sealed this
Fifth Day of November, 2013

Teresa Stanek Rea
*Deputy Director of the United States Patent and Trademark Office*